United States Patent [19]
Fujita et al.

[11] 3,918,066
[45] Nov. 4, 1975

[54] RECORDING CONTROLLER

[75] Inventors: Hisaya Fujita; Kinji Harada; Toru Tanazawa, all of Musashino, Japan

[73] Assignee: Yokogawa Electric Works, Ltd., Tokyo, Japan

[22] Filed: Dec. 12, 1974

[21] Appl. No.: 531,981

[30] Foreign Application Priority Data
Dec. 17, 1973 Japan.............................. 48-141721

[52] U.S. Cl................... 346/17; 346/32; 346/139 R
[51] Int. Cl.²....................................... G01D 15/16
[58] Field of Search................... 346/17, 32, 139 R; 237/551, 553, 554, 557, 558

[56] References Cited
UNITED STATES PATENTS

| | | | |
|---|---|---|---|
| 2,921,595 | 1/1960 | Erbguth | 346/17 X |
| 3,071,006 | 1/1963 | Hornfeck | 346/139 R X |
| 3,100,399 | 8/1963 | Robins | 346/139 R X |
| 3,209,363 | 9/1965 | Virbila | 346/17 |
| 3,264,650 | 8/1966 | Armstrong | 237/557 X |
| 3,269,352 | 8/1966 | Van Winkle | 346/17 X |
| 3,521,297 | 7/1970 | Bowditch | 346/139 R |
| 3,526,902 | 9/1970 | Holt, Jr. | 346/139 R |

*Primary Examiner*—Stephen J. Tomsky
*Assistant Examiner*—Stanley J. Witkowski
*Attorney, Agent, or Firm*—Parmelee, Johnson & Bollinger

[57] ABSTRACT

A recording controller of the type receiving an electrical measurement input signal and being arranged to generate a pneumatic output control signal for a pneumatically controlled element. When the controller receives an electrical measuring signal from a process detecting element, the servomotor of a balancing mechanism rotates to establish a balance, causing a measurement pointer to indicate the measured value on a scale, and causing a recording pen to record it on a chart. Any deviation between the measurement pointer and a set pointer with which the desired control value has been set is transmitted through a differential link mechanism capable of mechanically detecting the deviation between the two values. The detected deviation component, in the form of a mechanical displacement, is supplied to a pneumatic control mechanism which in turn supplies the final pneumatically controlled element with a pneumatic controlling signal computed to offset the deviation.

6 Claims, 8 Drawing Figures

RECORDING CONTROLLER

BACKGROUND OF THE INVENTION

1. Field of the Invention

Large scale industrial process plants, such as petroleum refining plants and fertilizer plants, typically operate under automatic control provided by suitable control systems. Such automatic control systems consist essentially of a detecting portion capable of detecting controlled variables (e.g., temperature and pressure), a control portion capable of generating the necessary control signal in response to the signal supplied from the detecting portion, and a final controlled device capable of influencing the controlled variables according to the signal supplied from the control portion. The controllers used in the control portion may be classified functionally as (1) blind controllers which generate only a control signal, (2) indicating controllers which generate a control signal and indicate the measured value, and (3) recording controllers which generate a control signal, and both indicate and record the measured value. The present invention relates to such recording controllers used for automatic control purposes.

2. Description of the Prior Art

A single-loop control system employing an easily operated, large size self-balancing recording controller is often used for temperature-control instrumentation in smallscale plants, e.g., dyestuff plants and rubber plants. Generally, in this type of control, it is desirable that the input signal to the controller be an electrical signal from a thermocouple, and that a pneumatic pressure be used as the control signal for directly controlling a diaphragm control valve.

A known electrical automatic control system, used to control furnace temperature, comprises a detector which detects temperatures in a furnace and generates an electric measuring signal; a controller which receives the signal from the detector, compares the measured signal value with a set value, and generates an electronic control signal according to the compared result (i.e., a deviation); and a controlled valve which governs the flow of fuel to the furnace according to the control signal from the controller. The controlled valve used in such a control system is usually a pneumatically driven flow-control type which makes high power available and operates with stability. Unfortunately, however, this type of valve cannot be driven directly with an electrical signal supplied from the controller, and the system thus requires an electric-to-pneumatic transducer such as a valve positioner. In practice, use of a valve positioner introduces a lag into the control action and complicates the overall instrument construction. Thus this type of controller arrangement is not entirely satisfactory, especially for single-loop control systems used in temperature control instrumentation on furnaces of small scale.

SUMMARY OF THE INVENTION

It is a principal object of the present invention to provide an improved recording controller instrument suitable for use in a single-loop control system. It is a specific object of the invention to provide a recording controller capable of receiving electrical inputs and capable of controlling pneumatic elements, without the addition of electric-to-pneumatic transducers such as valve positioners. Still another object of the invention is to provide a recording controller more suitable for commercial use.

In a preferred embodiment of the invention to be described hereinbelow in detail, the recording controller indicates and records the measured value of a controlled variable through use of an electrical self-balancing mechanism, and then mechanically operates a pneumatic controller mechanism directly from the mechanical elements used in the industry and recording operation, thus directly generating a pneumatic control signal with pneumatic devices. With the controller of this invention, therefore, the final pneumatically controlled element can be directly controlled without a separate electrical-to-pneumatic transducer, and the construction of an automatic control system can be simplified in operation and structure.

Other objects, aspects and advantages of the invention will be pointed out in, or apparent from, the detailed description hereinbelow, considered together with the following drawings.

DESCRIPTION OF THE PREFERRED EMBODIMENT

Figure 1:
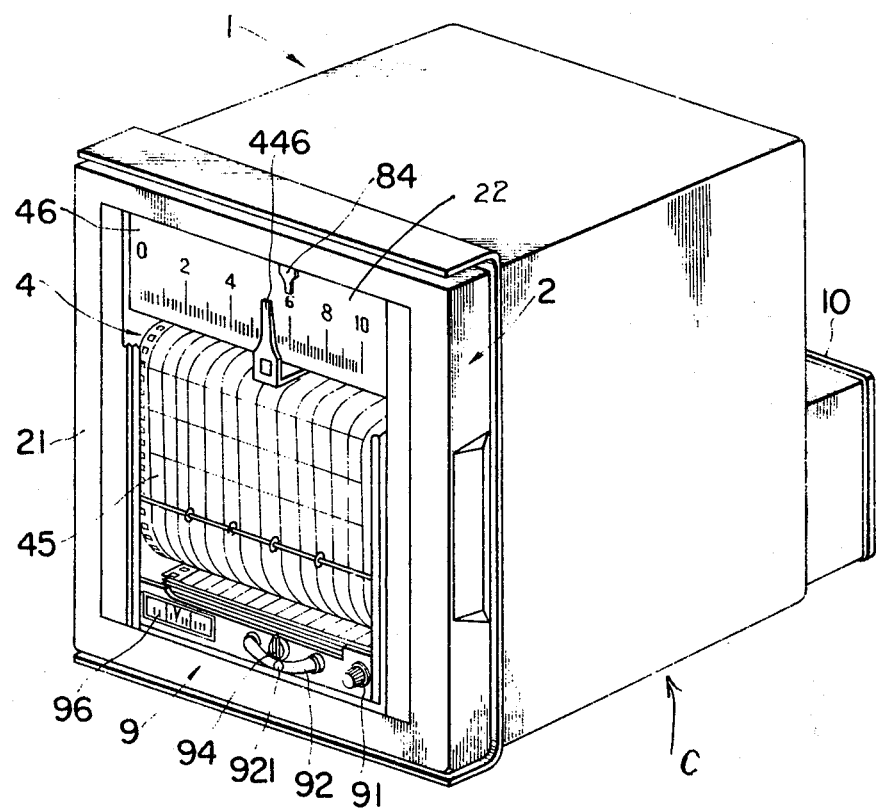
FIG. 1 is an external perspective view of a recording controller embodying the present invention.
Figure 2:
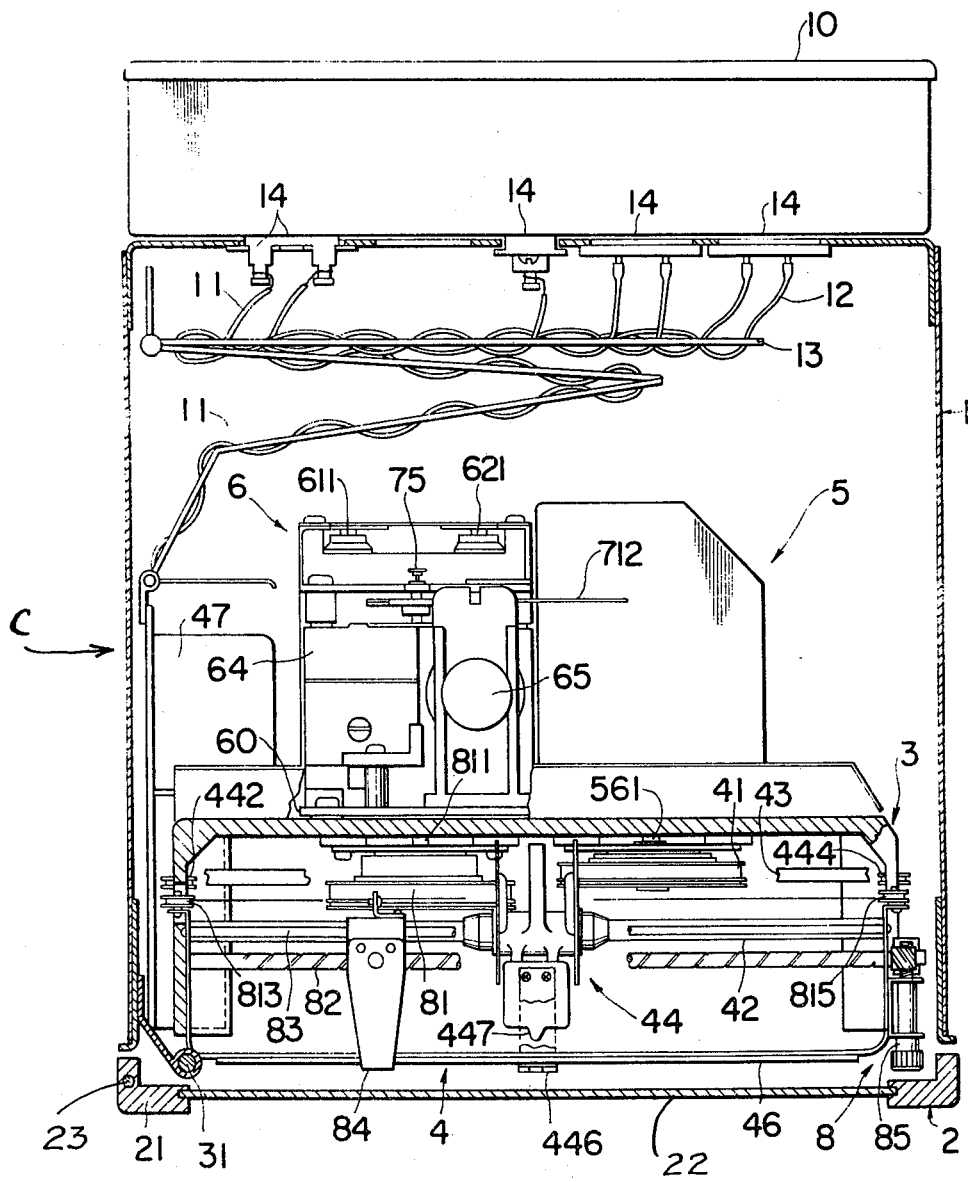
FIG. 2 is a sectional plan view, taken through a horizontal plane of FIG. 1, showing the internal construction of the controller.

The overall construction of a recording controller C according to the present invention is illustrated by the external view of FIG. 1 and by the internal sectional view of FIG. 2. As shown, controller C comprises an instrument housing 1 of square shape including a door 2. The door 2 has a door frame 21 in the form of a narrow rim arranged to support a central window 22. The door 2 is swingably supported by the body of housing 1, about the axis of hinge pins 23, and thus rotates about its left edge as veiwed from the front of the instrument. Inside housing 1, controller C has a main frame 3 with a U-shaped cross-section (FIG. 2), arranged to be swung out of the housing 1 on upper and lower hinges 31.

Main frame 3 carries on its front portion an indicating and recording mechanism 4 comprising a moving bracket 44 supported for sliding movement by rods 42 and 43, a recording chart 45 mounted adjacent window 22, a scale 46 adjacent the bracket 44, and a gear unit 47 for driving chart 45 with a motor attached to main frame 3. Moving bracket 44 is attached to a string 441 (FIG. 4) trained over rollers 442 and 445 and over a measurement pulley 41, and has a measurement pointer 446 adjacent scale 46 and a recording pen 447 arranged to contact chart 45.

Figure 3:
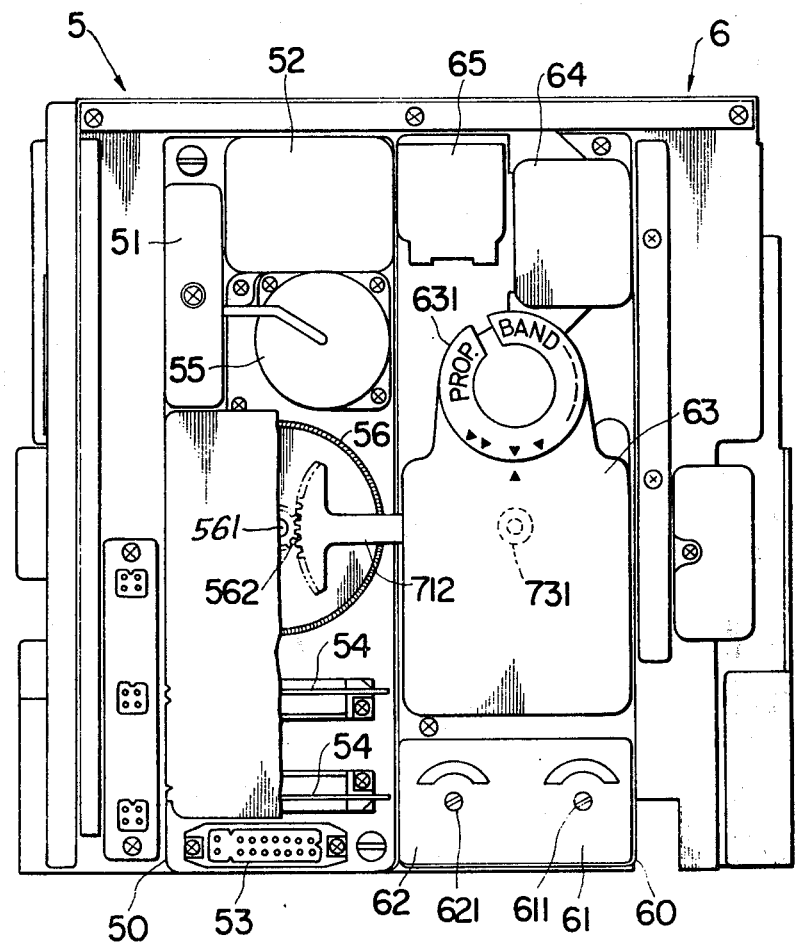
FIG. 3 is a rear elevational view showing part of the controller of FIG. 1.

An electrical self-balancing mechanism 5 is mounted on the back of the main frame 3. This mechanism, as shown in FIG. 3, comprises an intermediate terminal 51, a power transformer 52, an input connector 53, two printed circuit boards 54, a self-balancing motor 55, and a rotary slide resistor 56, which together form a servomechanism. The servomechanism is arranged, for example, so that an input electric signal of 0 to 10 mV is transduced into a rotating angle of 0° to 300° on the shaft 561 of the rotary slide resistor 56. The slide resistor shaft 561 has one end equipped with a gear 562, and has the other end coupled through the main frame 3 (FIG. 2) to the measurement pulley 41 to move string 441 and thereby drive the moving bracket 44 and the pointer 446 and pen 447 thereon.

A pneumatic control mechanism 6 is mounted abreast the electrical self-balancing mechanism 5 on the back of the main frame 3 (FIG. 3). The pneumatic control mechanism 6 comprises an integrating tank 61 and a differentiating tank 62, equipped with throttles 611 and 621 respectively, a controller 63 with a proportional band selection dial 631, a pilot relay 64 for an amplifier, and a receiver 65. As shown schematically in FIG. 5, the controller 63 comprises a nozzle flapper mechanism 66, a proportional bellows 67, an integrating bellows 68, and a cantilever 69. The flapper element of the nozzle flapper mechanism 66 engages with or disengages from the tip end of the nozzle in accordance with the displacement of a drive pin 661 pivotally attached to cantilever 69.

The control mechanism 6 and the balancing mechanism 5 have bases 60 and 50 respectively (FIG. 3) mounting the individual constituent elements to form component units. These bases, in turn, are secured to the main frame 3 with screws.

Figure 4:
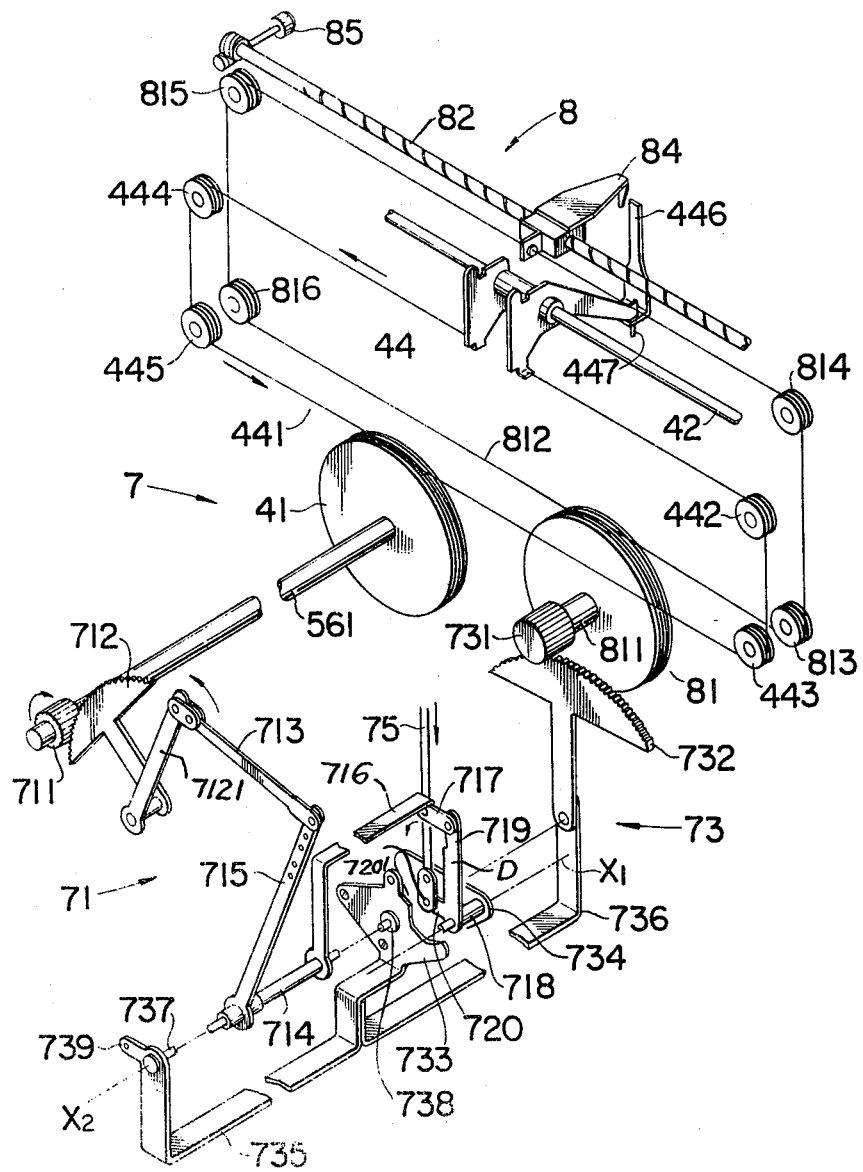
FIG. 4 is a perspective view with portions exploded, showing the construction of a differential link mechanism used in the controller of FIG. 1.

In order to set a value of the controlled variable to be maintained, controller C includes a setting mechanism 8 which, as shown in FIGS. 2 and 4, comprises a carriage rod 82 having coarsely pitched spiral grooves and a support rod 83 mounted in main frame 3, a set pointer 84 mounted upon rods 82 and 83, and a setting dial 85 coupled to carriage rod 82 to cause set pointer 84 to be positioned at a desired location on scale 46. The set pointer 84 is attached to a string 812 trained over rollers 813 and 816 and over a set position pulley 81 mounted on a shaft 811.

As shown in FIG. 4, the mechanical positions of measurement pointer 446 and set pointer 84 are mechanically correlated in the controller C by means of differential linkage mechanism 7 formed with a measuring link system 71 adapted to convey the rotating angle of the rotary slide resistor shaft 561, and a setting link system 73 adapted to convey the rotating angle of shaft 811 as set by the setting mechanism 8. The measuring link system 71 includes a gear 711 secured to the rotating slide resistor shaft 561, a sector gear 712 meshing with gear 711, an arm 7121 pivoting with sector gear 712, an adjusting link 713 joined to arm 7121, a rotating shaft 714, an arm 715 fastened to the rotating shaft 714 and joined to link 713, an L-shaped rod 716 fastened to shaft 714, and a deflection plate D which pivots about a deflection shaft 718 and which has an arm 719 connected to the L-shaped rod 716 by way of a connector 717. The deflection plate D also is formed with a displacement element 720 extending perpendicularly to arm 719.

The setting link system 73 comprises a gear 731 coupled to shaft 811 of the setting mechanism 8 and to a sector gear 732, a rocking frame 735 equipped with a rhombic side plate 733 and a triangular side plate 734, and a connecting plate 736 which connects the shaft of the sector gear 732 to the rocking frame 735 for rotation therewith. The two side plates 733 and 734 of rocking frame 735 support the deflection shaft 718 therebetween on an axis $X_1$. The rocking frame 735 is held between leading shafts 737 and 738 and is swung about the axis $X_2$ of these shafts.

Figure 6A:
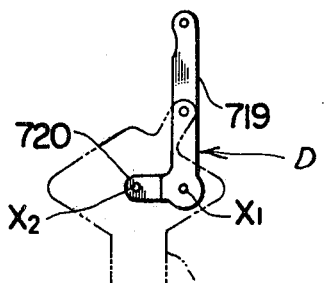
FIGS. 6a through 6c are diagrams illustrating the operation of the differential link mechanism of FIG. 4.
Figure 6B:
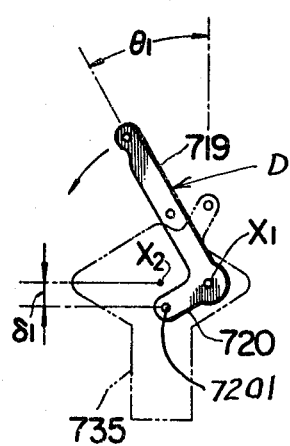
Figure 6C:
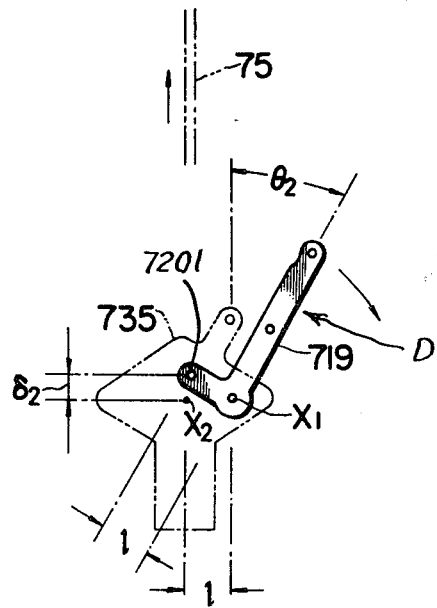

As shown in FIG. 4, the displacement element 720 is connected at connection point 7201 to a transmission link 75 leading to the control mechanism 6. As shown in FIG. 6C, the distance between the outer connection point 7201 of displacement element 720 and the axis $X_1$ of deflection shaft 718 is equal to the distance $l$ between axes $X_1$ and $X_2$. The two rotating angles transmitted separately by way of the measuring system 71 and the setting link system 73 thus are compared with each other at the deflection plate 719 and the rocking frame 735, which serve as the end elements of the two linkage systems respectively, causing the end of displacement element 720 to be displaced vertically by an amount which corresponds to the deviation between the set value of set pointer 84 and the measured value of indicating pointer 446. The displacement is transmitted to the control mechanism 6 by way of the transmission link 75 to institute an offsetting controlling action, as will be described below.

Figure 5:
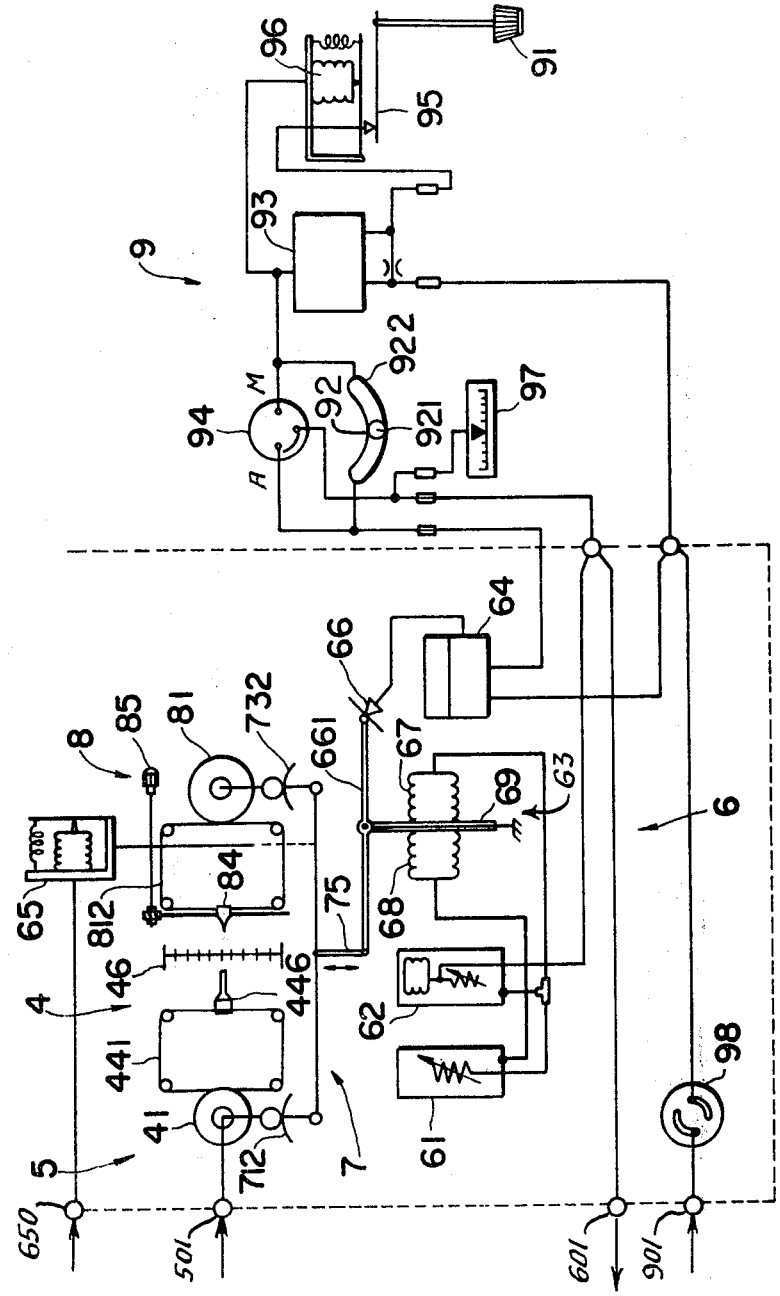
FIG. 5 is a schematic diagram showing the operative relationship of the elements of the controller.

Controller C further includes a regulating mechanism 9, affording manual control for overriding automatic control, and affording means facilitating a changeover from manual to automatic control. As shown in FIG. 1, the regulating mechanism 9 is provided on the front of main frame 3 at the front of controller C below the recording mechanism 4. A manual control knob 91 is installed there as shown in FIG. 1. Also provided in the regulating mechanism 9, as shown in FIG. 5, are a differential pressure gauge 92, a pilot relay 93, a selector switch 94 having position A for automatic operation and position M for manual operation, a nozzle flapper mechanism 95, and a feedback bellows 96. The differential gauge 92 has a ball 921 movably held in a downwardly bowed transparent tube 922. When the pressures at the two ends of the tube 922 are equal, the ball rests in the center of the tube due to gravity. The mechanism 9 further comprises an output meter 97, and an air pressure switch 98 in the supply line from pneumatic input terminal 901.

In FIGS. 1 and 2, external connections for wiring 11 and pneumatic conduits 12 are provided through a terminal box 10 fitted to the back of the housing 1. Connecting elements 14 are provided for external wiring and conduits, and inside housing 1 a zigzag holder 13 is provided for holding the wiring 11 and conduits 12.

The operation of recording controller C may be described by reference to FIGS. 5 and 6. An electrical measurement input signal arriving at input terminal 501 from a sensor in the controlled region is introduced into the balancing mechanism 5. The servomechanism, comprising the balancing motor 55 and slide resistor 56, actuates to rotate ths slide shaft 561 to cause the measuring pointer 446 to indicate the measured value on the scale 46. At the same time, the recording pen 447 comes into contact with the chart 45 which is driven by the gear unit 47 at a given speed. When the dial 85 of the set mechanism 8 is rotated, the feed rod 82 moves the set pointer 84 to allow the desired control value to be set on the scale 46. When there is no deviation between the set value indicated by pointer 84 and the measured value indicated by the pointer 446, the displacement element 720 of the differential link mechanism 7 lies on the axis $X_2$ of the rocking frame 735, as shown in FIG. 6a, whatever angular orientation is given to rocking frame 735 by dial 85 acting through linkage 73. No deviation being detected by the differential link mechanism 7, no mechanical displacement is delivered through transmission link 75 to control mechanism 6. When the measured value of the controlled variable increases to cause the pointer 446 to move to a value exceeding the value set by pointer 84, the slide shaft 561 rotates in the direction of the arrow shown in FIG. 4 and the deflection plate D is turned counterclockwise about the axis $X_1$ by the measuring link system 71, to become oriented at the angle $v1$ as shown in FIG. 6b. As a consequence, the connection point 7201 of displacement element 720 drops below the axis $X_2$ to cause the transmission link 75 to be displaced downwardly by the distance $+\delta_1$.

This displacement of transmission link 75 moves drive pin 661 of the control mechanism 6 which in turn moves the flapper of the nozzle flapper mechanism 66 and the nozzle back pressure changes accordingly (FIG. 5). This back pressure is fed back through the pilot relay 64 and, via selection switch 94 in position A, to differentiating and integrating tanks 61 and 62, to the bellows 67 and 68, and in conventional fashion the signal is computed for P.I.D. (proportional integrating and differentiating) control as it passes through these elements. The computed signal, i.e., a pneumatic control signal, is supplied at output terminal 601 to an external pneumatically-controlled element, such as a pneumatic diaphragm control valve, in a fashion to cancel the deviation. When the measuring pointer is below the set pointer (i.e., the deviation is negative), the deflection plate D assumes the position shown in FIG. 6c. Accordingly, the mechanical displacement $-\delta_2$ is applied to the transmission link 75, and, in the manner described above, the control mechanism 6 operates to deliver the necessary pneumatic control signal at terminal 601 for automatic P.I.D. control.

For manual control, the transfer switch 94 of the regulating mechanism 9 is placed at position M and a pneumatic signal manually controlled by knob 91 is supplied at terminal 601 to an external pneumatically controlled element. When transfer between manual and automatic modes is needed, knob 91 is manipulated until the ball 921 of differential pressure gauge 92 is positioned in the center of the tube 922 to make the output pressure of the control mechanism 6 equal to the manually controlled pressure. Then the position of the switch 94 may be changed over to position A. In this manner, disturbance at the final controlling element upon transfer between manual and automatic modes can be prevented.

To provide cascade control based upon a primary control signal received at terminal 650 by receiver 65 rather than upon a set value, it is necessary to remove the set mechanism 8 or disconnect it from setting link system 73, and to mechanically connect the receiver 65 with the connector arm 739 provided at the end of the rocking frame 735 (FIG. 4). Then the output signal from the primary controller, introduced into the receiver 65, makes automatic cascade control available.

According to the invention, as has been described, an electrical input, pneumatic output recording controller is provided by suitably interrelating a pneumatic controller and an electronic type self-balancing recorder through a mechanical differential linkage. In this construction, the indicating and recording mechanism 4, the setting mechanism 8, and the regulating mechanism 9 are installed on the front side of main frame 3, and the self-balancing mechanism 5 and the pneumatic control mechanism 6 are installed on the back. The balancing mechanism 5 and the setting mechanism 8 are coupled by means of a differential link mechanism 7 which comprises two link systems compared with rotary end elements to yield a differential deviation signal as a mechanical displacement. The displacement detected by the link mechanism 7 is supplied to the pneumatic controller mechanism 6. These arrangements make the instrument of the present invention a highly efficient recording controller suited for a single-loop control system. Furthermore, because the balancing mechanism 5 and the control mechanism 6 are built as units on individual base plates 50 and 60, design modification and control adjustment are simplified.

Although specific embodiments of the invention have been disclosed herein in detail, it is to be understood that this is for the purpose of illustrating the invention and should not be construed as necessarily limiting the scope of the invention, since it is apparent that many changes can be made to the disclosed structures by those skilled in the art to suit particular applications.

We claim:

1. A recording controller of the type arranged to receive an electrical measurement input signal corresponding to the value of a controlled variable, and, in response to the electrical input signal, to indicate and record the measured value of the variable and to govern a pneumatically controlled element influencing the controlled variable so as to maintain the variable at a set value, comprising:
   indicating and recording means for receiving the electrical measurement input signal and for mechanically positioning a measurement pointer along a scale to indicate the measured value of the controlled variable;
   setting means for mechanically positioning a set pointer along the scale to indicate the set value of the controlled variable;
   differential linkage means, mechanically coupled to the means for positioning the measurement and set pointers, for mechanically detecting a deviation between the measured and set values of the controlled variable and for displacing the position of a mechanical element in correspondence with the detected deviation; and
   pneumatic controller means responsive to displcacement of the mechanical element to generate a prescribed pneumatic control signal for application to the pneumatically controlled element to correct the detected deviation,
   whereby the recording controller provides a pneumatic control signal directly from the indicating and setting means, without a separate electrical-to-pneumatic transducer.

2. A recording controller as claimed in claim 1 wherein the indicating and recording means comprises an electrical self-balancing mechanism including a servomotor having a shaft rotated according to the electrical measurement input signal until electrical balance is attained, and means driven by the servomotor shaft for positioning the measurement pointer along the scale.

3. A recording controller as claimed in claim 1 further comprising regulating means with means for manually controlling pneumatic pressure, means for comparing the manually controlled pneumatic pressure with the pressure of the pneumatic control signal, and means for selecting between the manually controlled pneumatic pressure and the pneumatic control signal for application to the pneumatically controlled element.

4. A recording controller as claimed in claim 1 wherein the differential linkage means comprises a first linkage system coupled to the means for positioning the measurement pointer for controlling the angular position of a first end element attached to the displaceable mechanical element; and a second linkage system coupled to the means for positioning the set pointer for controlling the angular position of a second end element, said first and second end elements being rotatably coupled, whereby the deviation between the angular positions of the end elements displaces the position of the mechanical element in correspondence with the detected deviation.

5. A recording controller as claimed in claim 4 wherein the first end element rotates about a first axis, and the second end element rotates about a second axis, said first axis being fixed in relation to the second end element and moving therewith, the first end element being connected to said mechanical element at a point spaced from the first axis by a distance equal to the distance between the first and second axes.

6. A recording controller of the type provided with an electrical self-balancing meter portion and a pneumatic controller portion, comprising:

a housing enclosing a main frame, and, mounted on the front portion of the main frame:

a. an indicating and recording mechanism in which a movable carrier is moved along a scale by way of a string coupled with a measuring pulley and in which a measured value of a controlled variable is indicated on the scale by a pointer associated with the movable carrier and is recorded on a recording chart by a recording pen;

b. a setting mechanism in which a set pointer is moved along the scale by a setting dial with a string coupled with a setting pulley, whereby a set value of the controlled variable is set; and c. A regulating mechanism with means for manually controlling pressure, a differential gauge for comparing the manually controlled pressure with the pressure of an automatically controlled pneumatic control signal, and a transfer switch for selecting between the manually and automatically controlled pressures;

and, mounted on the back portion of the main frame:

d. a balancing mechanism having a servomechanism in which a servomotor is rotated according to an input electric signal until a balance is reached, and the measuring pulley is driven by the servomotor;

e. a pneumatic control mechanism installed abreast the balancing mechanism on the main frame in which the necessary control action is produced according to an input displacement, thereby causing the automatically controlled pneumatic control signal to be generated; and f. a differential link mechanism comprising: a measuring link system and a setting link system, the link systems having sector gears as lead elements which engage with gears on the shafts coupled to the measuring pulley and the setting pulley respectively; in which the end elements of the two link systems are compared with each other to detect a displacement corresponding to the deviation between the measured value and the set point, and the detected displacement is supplied to the control mechanism.

* * * * *

UNITED STATES PATENT OFFICE
CERTIFICATE OF CORRECTION

Patent No. 3,918,066              Dated November 4, 1975

Inventor(s) Hisaya Fujita, et al

It is certified that error appears in the above-identified patent and that said Letters Patent are hereby corrected as shown below:

Column 2 line 61          Change "and" first occurrence to --to--

Column 3 line 41          Change "and" first occurrence to --to--

Column 5 line 12          Change "v1" to -- θ 1--

Signed and Sealed this second Day of March 1976

[SEAL]

Attest:

RUTH C. MASON
Attesting Officer

C. MARSHALL DANN
Commissioner of Patents and Trademarks